US009294277B2

(12) United States Patent
Poston, Jr. et al.

(10) Patent No.: US 9,294,277 B2
(45) Date of Patent: Mar. 22, 2016

(54) AUDIO ENCRYPTION SYSTEMS AND METHODS

(76) Inventors: Alexander Poston, Jr., Nashville, TN (US); Jackson Robert Harper, Norwood, MA (US)

( * ) Notice: Subject to any disclaimer, the term of this patent is extended or adjusted under 35 U.S.C. 154(b) by 992 days.

(21) Appl. No.: 13/419,416

(22) Filed: Mar. 13, 2012

(65) Prior Publication Data

US 2013/0243186 A1  Sep. 19, 2013

(51) Int. Cl.
| | |
|---|---|
| *H04L 9/00* | (2006.01) |
| *H04K 1/00* | (2006.01) |
| *G10L 15/00* | (2013.01) |
| *G10L 15/04* | (2013.01) |
| *G06F 17/28* | (2006.01) |
| *H04L 9/28* | (2006.01) |
| *H04L 9/18* | (2006.01) |
| *G10L 13/00* | (2006.01) |
| *G10L 15/30* | (2013.01) |

(52) U.S. Cl.
CPC . *H04L 9/28* (2013.01); *G10L 13/00* (2013.01); *G10L 15/30* (2013.01); *H04L 9/18* (2013.01)

(58) Field of Classification Search
CPC .............................. H04L 9/065; H04L 29/067
See application file for complete search history.

(56) References Cited

U.S. PATENT DOCUMENTS

| | | |
|---|---|---|
| 2003/0169730 A1 | 9/2003 | Narasimhan |
| 2005/0187766 A1 | 8/2005 | Rennillo |
| 2007/0255941 A1* | 11/2007 | Ellis .............................. 713/151 |
| 2008/0288250 A1 | 11/2008 | Rennillo |
| 2009/0197573 A1 | 8/2009 | Rofougaran |
| 2011/0222688 A1* | 9/2011 | Graham et al. ............... 380/247 |
| 2011/0302408 A1 | 12/2011 | McDermott |
| 2012/0020475 A1 | 1/2012 | Altmann |

* cited by examiner

*Primary Examiner* — Azizul Choudhury
(74) *Attorney, Agent, or Firm* — Triangle Patents, PLLC

(57) ABSTRACT

Encryption systems and methods for audio data, and more particularly, for complete audio encryption of recorded data for transmission, management, review, and modification or transformation of selected segments of encrypted audio data, without compromising data security by exposing unencrypted data at any time.

13 Claims, 6 Drawing Sheets

| Id | ByteBegin | NumberOfBytes | StreamOffset | SlicePath |
|---|---|---|---|---|
| 1 | 4096 | 340680 | 0 | 1 |
| 2 | 344776 | 27336 | 0 | 2 |
| 3 | 372112 | 70856 | 0 | 3 |
| 4 | 442968 | 168742 | 0 | 4 |
| 5 | 611710 | 906406 | 0 | 5 |
| 6 | 1518116 | 49538 | 0 | 6 |
| 7 | 1619000 | 44800 | 1055100 | 7 |
| 8 | 1567654 | 654024 | 0 | 8 |

FIG. 3

AUDIO ENCRYPTION SYSTEMS AND METHODS

BACKGROUND OF THE INVENTION

1. Field of the Invention

The present invention relates to encryption systems and methods for audio data, and more particularly, for complete security for audio encryption of recorded data for transmission, management, and modification or transformation thereof.

2. Description of the Prior Art

Prior art includes automatic systems and methods for transcription of medical dictation, including, by way of example, the following:

US Patent Application Publication No. 20080288250 by inventors Renillo, et al. for Real-time transcription system, published Nov. 20, 2008 for a transcription system and method that includes a transcription terminal for recording electronically generated text as units of transcribed text, and a conversion unit for translating the units of ascribed text into a generally accurate transcript of the electronically generated text and converting said transcript into a signal to be transmitted to an authorized receiving unit over a communication link, including a wireless access point for transmitting serial data representing the transcript, and suppression of an automatic network identifier.

US Patent Application Publication No. 20050187766 by inventors Renillo, et al. for Real-time transcription system, published Aug. 25, 2005 for a transcription system and method that includes a transcription terminal for recording spoken words as units of transcribed text, and a conversion unit for translating the units of transcribed text into a generally accurate transcript of the spoken words and converting said transcript into a signal to be transmitted to an authorized receiving unit over a communication link, including a wireless access point for transmitting serial data representing the transcript, and suppression of an automatic network identifier.

US Patent Application Publication No. 20090197573 by inventor Rofougaran for Secure use of a handheld computing unit, published Aug. 6, 2009 for a handheld computing unit including a wireless transceiver and a processing module, which is coupled to detect initiation of the handheld computing unit so that when the initiation is detected, the processing module initiates collection of a user security parameter, receives an input corresponding to the user security parameter, and converts the input into the outbound symbol stream, which is converted into an outbound wireless signal and transmitted; the processing module further converts an inbound symbol stream into a security response, interprets the security response, and when it is favorable, enables use of the handheld computing unit.

Relevant art also includes systems and methods for secure audio transmission and/or communication, including, by way of example, the following:

US Patent Application Publication No. 20030169730 by inventors Narasimhan, et al. for Method and process for signaling, communication and administration of networked objects, published Sep. 11, 2003 for systems and processes for communication of messages between one or more networked objects on circuit data networks, including means for representation of various communication types, including content description and disposition rules, delivery and routing description and rules, conversion and translation descriptions and rules, and methods for interactions and for administration over one or more network types, through one or more communication protocol types, to one or more destination types. The delivery of messages and other communication over various communication protocols in addition to emails are described, as well as methods for administering and managing rules for directing and transforming the messages and communications for purposes of routing or delivery to one or more specific destinations.

US Patent Application Publication No. 20110222688 by inventors Graham, et al. for One vault voice encryption, published Sep. 15, 2011 for secure voice solutions for mobile communication device Blackberry 9000 (BOLD™), providing that rather than making encrypted voice calls through traditional GSM cellular phone calls, voice data is received from the user using a device microphone and built-in media player software; that data is then encrypted and sent as an IP packet; the device then receives as IP packets, encrypted voice communication from the other party in the encrypted call, which in turn are decrypted in the device and then played back on a second media player running on that device. This requires that the device runs two media players simultaneously, in order to in effect, simulate a cellular telephone call, so that PDA-type devices provide for encrypted calls wherein the calls are placed over the Internet, rather than traditional cellular data signals.

US Patent Application Publication No. 20110302408 by inventors McDermott, et al. for Secure communication systems, methods, and devices, published Dec. 11, 2011 for secure communication systems including voice call processing server, user database in communication with the server, a security gateway in communication with the server and the database, wherein the gateway transmits an encrypted signaling key and at least one media key in response to validating a mobile device using configuration data stored in the database, wherein the server tracks call traffic encrypted using the at least one media key, and the traffic being routed through the internet.

US Patent Application Publication No. 20120020475 by inventor Altmann for Mechanism for partial encryption of data streams, published Jan. 26, 2012 for partial encryption of data streams, with methods including receiving a data stream at a data transmitting device, wherein the data stream has content including one or more audio content, video content, and control content; determining one or more content that are to be encrypted; partially encrypting the data stream by encrypting the one or more content, and leaving the other content unencrypted, and transmitting from the data transmitting device, the partially encrypted data stream to a data receiving device.

None of the prior art or relevant art cited or known at the time of the invention addresses the longstanding, unmet need for secure audio data storage, review, transmission, management, and transcription from audio to corresponding text (where appropriate), much less in the rapidly changing environment in any business or industry, in particular but not limited to in law enforcement, legal, and healthcare applications of electronic records (ER), where systems and processes need to be moving toward further efficiency, cost reduction, and paperless systems, all while requiring data privacy and security. In particular, a dramatic increase in the number of mobile devices, especially smartphones and tablet devices, which function substantially like computers, containing data that is at risk of being exposed, simply due to their mobility. Thus, the need for ensuring privacy and security of mobile data is greater than at any other time.

SUMMARY OF THE INVENTION

The present invention relates to encryption systems and methods for complete audio encryption of recorded data for transmission, management, and modification or transformation thereof from a mobile device without compromising data security by exposing unencrypted data at any time.

It is an object of this invention to provide systems and methods for real-time encryption of recorded audio data for saving, managing, editing, transmitting, reviewing, and combinations thereof, wherein all functions are performed on a mobile device.

It is another object of the present invention to provide methods for real-time encryption of audio inputs, automatically creating encrypted audio data upon recording, for saving, managing, editing, transmitting, reviewing, and combinations thereof.

Accordingly, a broad embodiment of this invention is directed to systems and methods having a remote server computer in communication with a network over which distributed users having authorization to access the system provide inputs of audio from respective mobile devices having iOS operating systems, wherein the inputs are preferably provided as voice-based audio of spoken words, that are transformed in real time to encrypted audio data upon recordation on the mobile device, and wherein the encrypted audio data is automatically available for selectively activating functions on the mobile device, within a software application operable thereon, including saving, managing, editing, deleting to end, transmitting, and/or reviewing and for automatically transforming the encrypted audio data to encrypted text that corresponds to the audio inputs.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 shows a screen shot of data stored in an audio files database and a screenshot of the corresponding files on disk.

DETAILED DESCRIPTION

Figure 1:
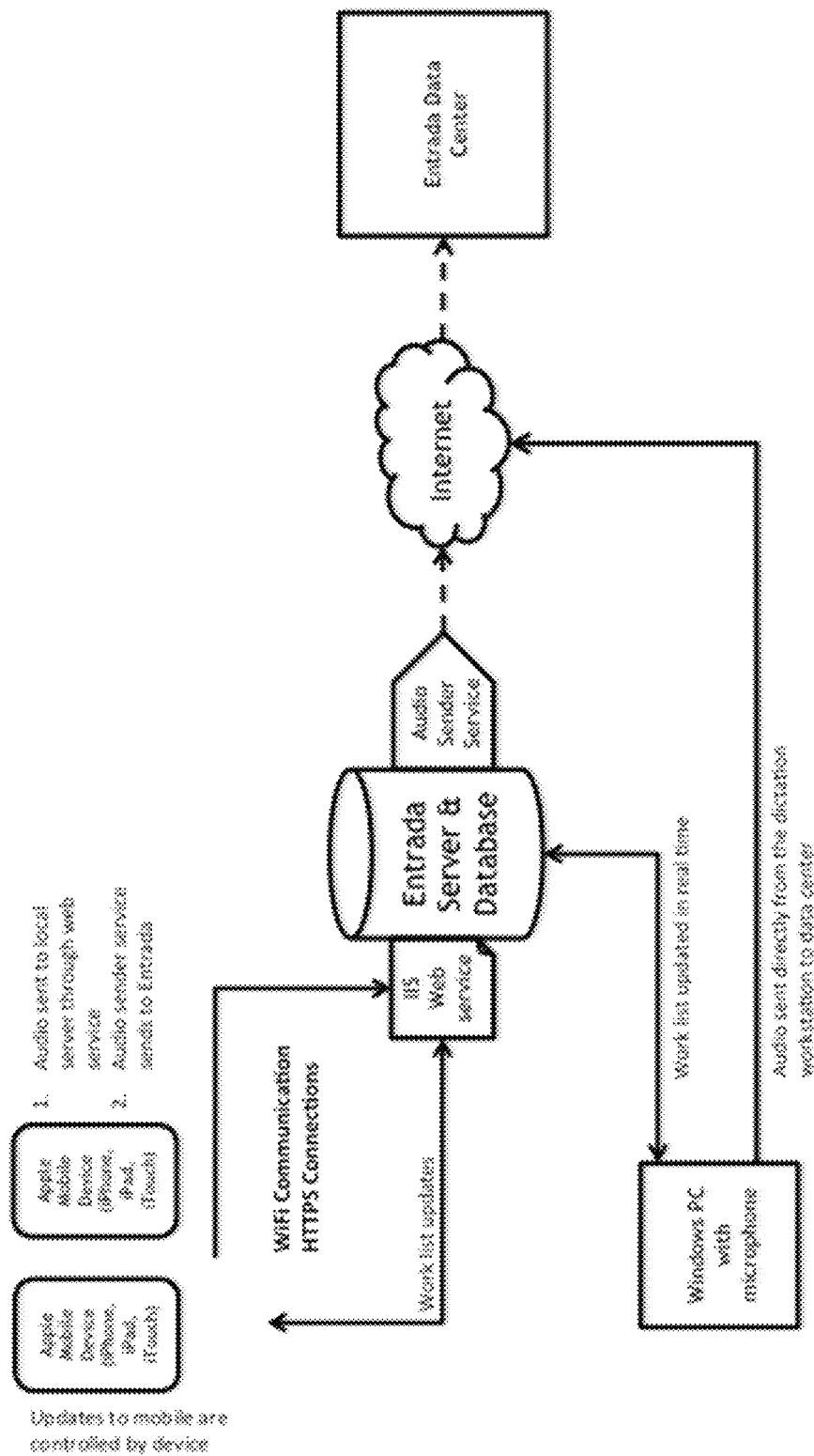
FIG. 1 is a schematic diagram of one embodiment of the invention including at least one mobile device, remote server computer/database, and communications network.
Figure 2:
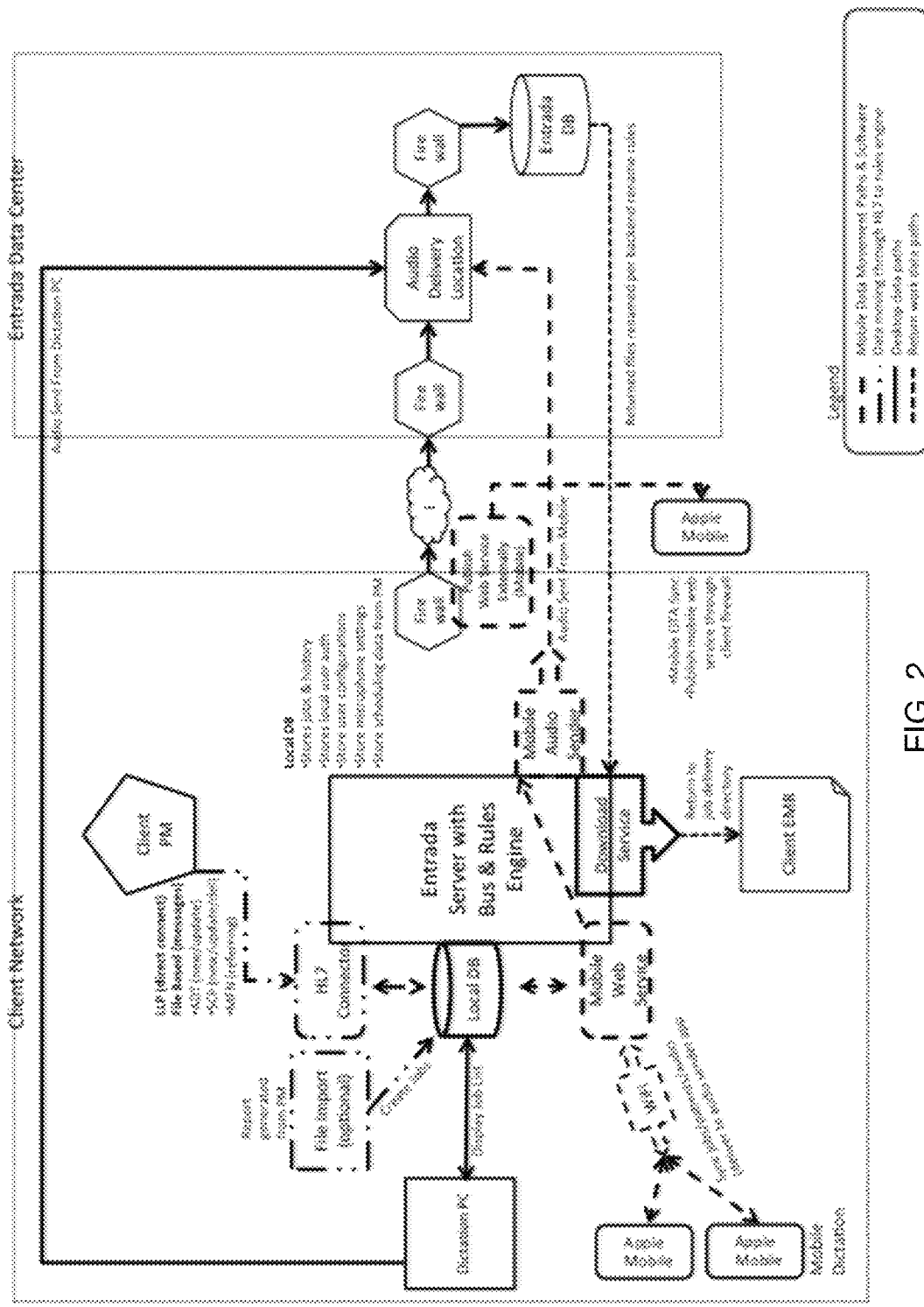
FIG. 2 is another schematic diagram of an embodiment of the present invention including at least one mobile device, remote server computer/database, and communications network.

Referring to the drawings in general, the illustrations are for the purpose of describing preferred embodiments of the invention, and are not intended to limit the invention thereto. FIG. 1 illustrates a schematic diagram of a remote server computer and network connection with at least one mobile device in communication with the remote server computer for providing the means for receiving audio inputs via the at least one mobile device and immediately transforming the audio inputs into encrypted audio data recorded on the device. FIG. 2 is another schematic diagram of an embodiment of the present invention including at least one mobile device, remote server computer/database, and communications network.

The present invention provides a mobile-device-based application used to capture audio inputs and automatically transform them into encrypted audio data, and most preferably, automatically transform them into a series of segments of encrypted audio data, wherein the segments are exactly the same size or length (e.g., 128 bytes).

Significantly, the systems and methods of the present invention thus provide for totally and completely encrypted audio as the audio inputs are being recorded, i.e., in real time or near real-time, to ensure data security of the audio recorded, even if the device is compromised. Furthermore, all other processing of the encrypted audio data including but not limited to reviewing, saving, transmitting, transcribing, editing, and combinations thereof provide for encrypted data management, i.e., all audio is encrypted and the audio data is never un-encrypted storage on the mobile device.

The methods of the present invention include steps for mobile devices having iOS operating systems, wherein the inputs are preferably provided as voice-based audio of spoken words, to be transformed in real time to encrypted audio data upon recordation on the mobile device, and wherein the encrypted audio data is automatically available for selectively activating functions on the mobile device, within a software application operable thereon, including saving, managing, editing, transmitting, and/or reviewing and for automatically transforming the encrypted audio data to encrypted text that corresponds to the audio inputs.

The application provides for a voice audio file to be captured through a microphone in the mobile device, or wirelessly via Bluetooth technology or any other microphone-based input connected with the device, either wirelessly or with wired connection, and encrypted in real time to ensure complete data security, whether in audio or data text format. At the time of recording of the audio inputs by the mobile device, the system automatically converts or transforms the audio inputs into encrypted audio data, without user intervention. The systems and methods of the present invention are further operable for automatically storing the encrypted audio as a series of encrypted segments in a database, which contains offsets into those slices for playback. A segment refers to an on disk segment of data, a slice is a portion of a segment. Multiple slices could point to different sections of a single segment. Also, as an analogy, an entire recording is considered a library, wherein a segment represents a book, and a slice represents a chapter or several chapters in that book. This format allows other operations on the encrypted data to occur instantly, and defers editing computations until playback, at a later time.

Figure 5:
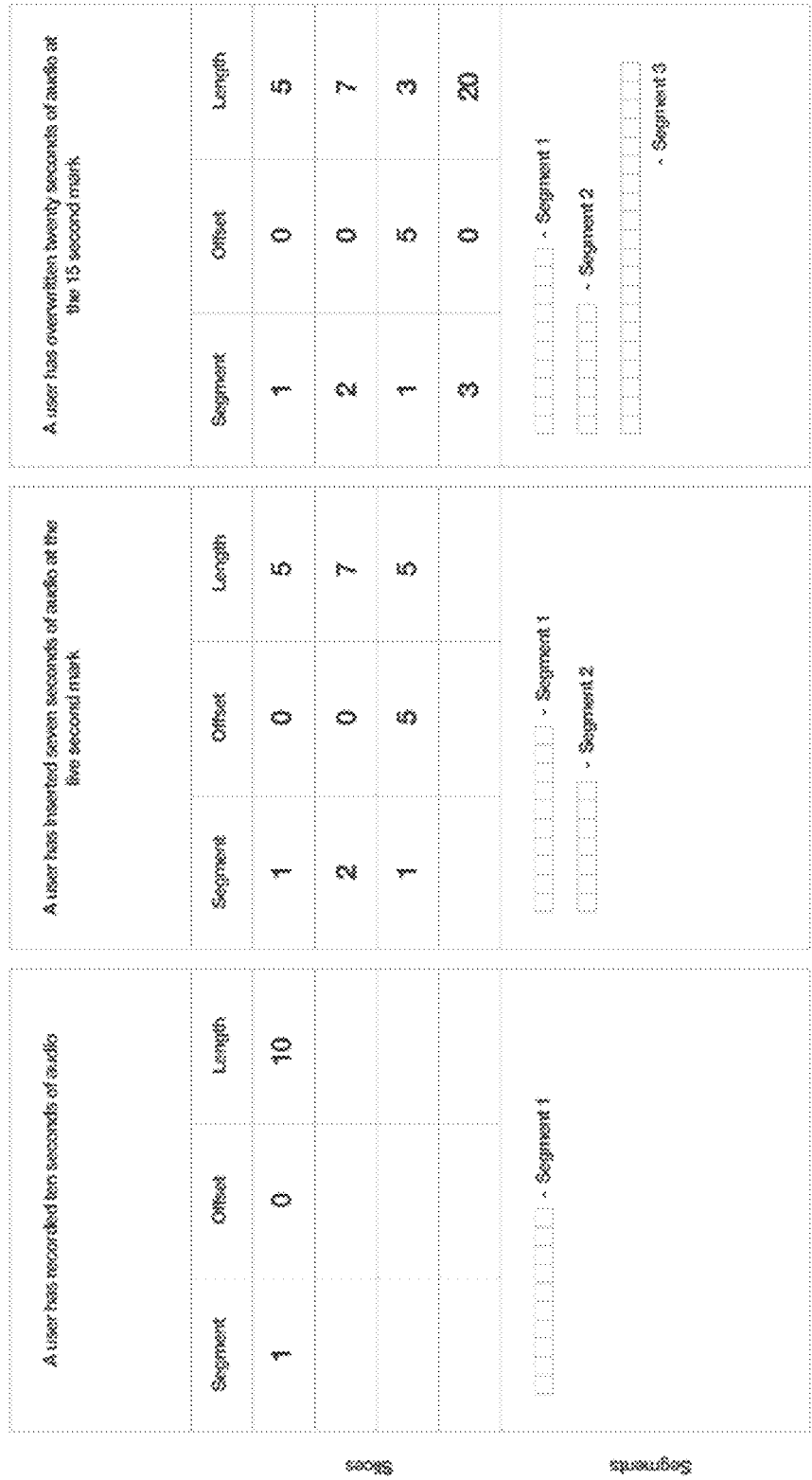
FIG. 5 is a flow diagram of methods according to the present invention, specifically relating to mobile device-based editing of encrypted audio data.

FIG. 5 is a flow diagram of methods according to the present invention, specifically relating to mobile device-based editing of encrypted audio data. Audio inputs are received by the mobile device via a microphone, or wirelessly via Bluetooth technology or any other microphone-based input connected with the device, either wirelessly or with wired connection, and automatically transformed into encrypted audio data, and stored in memory on the mobile device. The encrypted audio data available for editing includes a first continuous segment of audio input recorded on the mobile device; the software application that is operating on the mobile device automatically transforms the first continuous segment of audio input into encrypted audio data at the time of recordation to ensure complete data security. The encrypted data corresponding to the first continuous segment of audio input recorded is further transformed into a series of segments of exactly the same length or size that are saved to an on disk file. Then the authorized dictator user for the mobile device provides a selection input via interactive graphic user interface, wherein the selection includes a specific editing function to be performed to a specific slice of encrypted data (wherein a slice of encrypted data is a subset of the segment), and then the mobile device software application automatically performs the specific editing function to the specific slice of encrypted data within a data segment.

For an inserting function, an insert audio input is recorded and the corresponding encrypted audio data associated with the insert audio input is automatically offset within the first segment of encrypted data. After the insertion, the encrypted data with insertion are transformed into a new edited encrypted data file, and stored on the remote server computer. During playback or upload functions of the encrypted audio data files, when the underlying audio functions of the present invention request audio data, the remote server and/or database is automatically queried, and encrypted audio data automatically read from the encrypted audio data slices based on the offsets and lengths of encrypted audio data that is automatically stored in the remote server and/or database.

To illustrate one aspect of the present invention, FIG. 3 shows a screen shot of the data stored in an audio files database and just a screenshot of the corresponding files on disk. In the attached screenshot the system automatically created encrypted audio data from an audio input from a dictation user, and provided for the system to create a number of continuous segments (in series) of the encrypted audio data by recording and then pausing; these slices are numbered in series accordingly on the right side of the screen shot. However, for the encrypted audio data having a slice 6, the system provided for the function of rewind through most of that particular slice (number 6) and began recording in an overwrite mode, thereby automatically transforming the encrypted data series to include a slice 7 of the encrypted audio data, which has a stream offset as illustrated in the left side of the screen shot of FIG. 3.

Advantageously, the systems and methods of the present invention provide for automatic transformation of the audio inputs into encrypted audio data as it is being recorded by encryption of a segment of data, i.e., a predetermined amount of data, preferably a predetermined amount of data, wherein each predetermined amount of data is exactly the same length; in a most preferred embodiment, the predetermined amount of data is equivalent to 128 bytes. The recording, saving or storing, transmitting to the remote server computer over the network (wireless or otherwise), reviewing, editing (including inserting, deleting, overwriting, etc.) are steps that are all performed on the encrypted audio data, thereby ensuring that the audio inputs, once recorded on the mobile device, are secure. In other words, dictator users can dictate discrete text segments while still having the speed and flexibility of mobility, i.e., using a mobile device for targeted, field-specific dictation of audio data into a templated interactive graphic user interface (GUI), wherein on a real-time basis of dictation, the audio data stream is transformed automatically by the system into encrypted chunks of recorded data.

Figure 4:
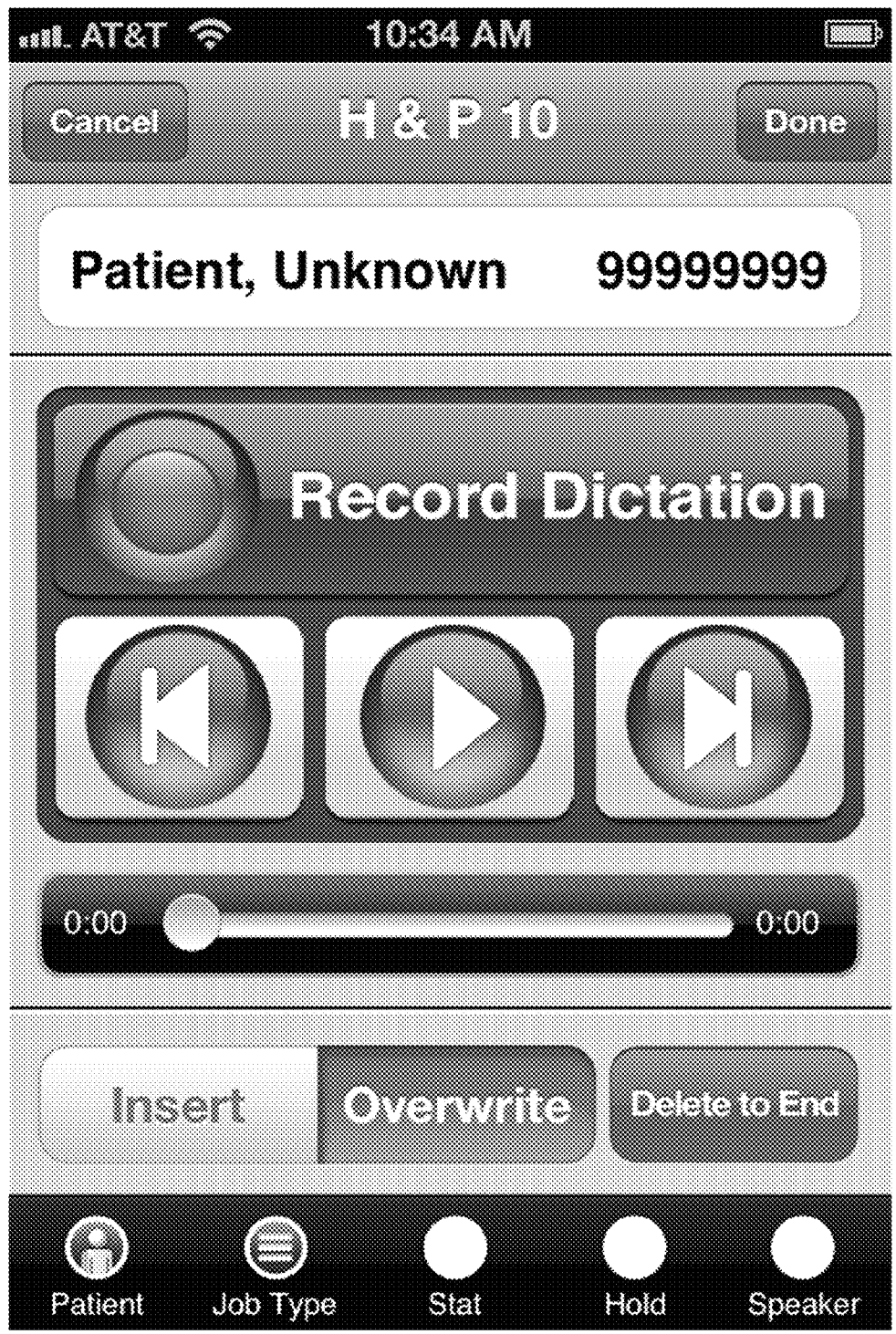
FIG. 4 illustrates a screen shot of an interactive graphic user interface (GUI) on a mobile device according to one embodiment of the present invention.

FIG. 4 illustrates one interactive GUI for editing encrypted audio data on a mobile device, with click-select or touch-select items that control corresponding functionality relating to editing as set forth in the foregoing.

Overall, the present invention provides methods for secure audio data management including the steps of: providing a base system including a remote server computer having a memory, a processor, and power supply connected thereto, in communication via a network with at least one mobile device constructed and configured for receiving an audio input; and the system receiving or recording the audio input by the at least one mobile device and automatically transforming the audio input into encrypted audio data at the time the audio input is being recorded on the at least one mobile device, and the system automatically transforming the encrypted audio data into a series of encrypted audio data slices, each of the slices having an order and a content, respectively, wherein each of the encrypted audio data slices is editable in its encrypted form, without affecting the order or content of the non-edited segments, thereby providing completely encrypted audio for secure audio data management.

Also, method steps of the present invention further include at least one mobile device(s) communicating with the remote server computer via wireless communication over the network for transmitting the encrypted audio data, wherein the method provides the audio data and/or its transcribed equivalent are completely encrypted from the time of generation and capture as the audio input by the at least one mobile device. Furthermore, immediately upon recording the audio input, the system automatically transforms the encrypted audio data into a series of encrypted audio data slices, each of the slices having an order and a content, respectively, wherein each of the encrypted audio data slices is editable in its encrypted form, without affecting the order or content of the non-edited slices.

The management of the audio data, which is encrypted at all times on the mobile device, includes but is not limited to the following functions: reviewing, saving, transferring to a remote data server (database), editing, editing remotely from the dictation generation and/or on a mobile device by the dictation user/generator, deleting, forwarding to remote server and/or database for storage and other processing, and combinations thereof.

In preferred broad embodiment of the present invention, systems and methods include operations on a mobile device using iOS platform for receiving inputs of audio, namely voice-based audio of spoken words, that are automatically transformed in real time upon recording to encrypted audio data. The encrypted audio data is managed later with functions including saving, editing, transmitting, and/or reviewing. Thus, the present invention provides responsive editing and seeking of encrypted audio data on mobile devices, most preferably those having proprietary iOS platforms thereon, namely iPhone, iPad, iPod Touch, and combinations thereof. The software of the present invention is particularly suited to operation on this proprietary iOS, since it provides for automatic management of the encrypted audio data in modules of predetermined size (e.g., 128 bytes) for rapid, responsive editing while maintaining data security on mobile devices.

Examples of applications of the present invention systems and methods include, but are not limited to mobile device-based dictation for Healthcare, Law Enforcement, Legal, Education, Business, Consulting, Financial and Accounting, and any application where data security of recorded audio and electronic records management is important. Furthermore, the present invention is provided for any application where data needs to be captured remotely and reported into a central database. Thus, the present invention systems and methods provide for multiple entities to share secure, confidential notes created to document services performed at the point of provision, (e.g., in medical practices this means patient care), with all notes, from audio recording at the point of dictation on a mobile device to transcription, being completely encrypted to ensure data security.

Healthcare Example

Today, several competing forces are converging to put tremendous pressure on physician productivity in the United States: First, the demand for clinical services is growing with an expanding and aging population, and millions of newly insured patients. The U.S. population is projected to grow by 14% between 2005 and 2020, and this population is getting older as the "Baby Boomer" generation enters its 60s and 70s. Also, the recently passed health reform act in the U.S. will add up to 32 million newly insured people by mid-2013. Against that backdrop of growing demand are projections for flat growth in the number of practicing physicians over the next 15 years, particularly in the surgical specialties. Moreover, independent research shows that physician productivity is clearly being reduced by the time-consuming data entry models of Electronic Health Record (EHR) systems, which are being aggressively promoted and subsidized by the Federal Government. This problem of EHR systems impeding physician productivity is so acute that many organizations have resorted to hiring data entry clerks as full time employees who shadow physicians over the course of their patient visits and enter data into mobile computers.

The recently passed American Recovery and Reinvestment Act (i.e. the Stimulus Package) is funneling over $19 Billion into Health IT infrastructure over the next several years. Of this amount, $17 Billion will reimburse hospitals and physicians for the implementation and use of "meaningful" certified Electronic Health Record (EHR/EMR) systems. As a result there will be an acceleration of activity, development and aggregation within the Health IT industry. However, no solutions provide for integrated, secure audio introduction of data into EMRs or other healthcare data systems. Furthermore, some of the most significant problems within this healthcare industry, the largest industry in the U.S., is adopting electronic systems and embracing infrastructure change while protecting physician productivity, driving costs from the system, and reducing days in Accounts Receivable by accelerating chart completion for billing, all while ensuring patient data privacy and data security at all times.

The present invention includes technology solutions that address the longstanding and unmet needs in the healthcare market and the context of growing, aging population with increasing demands on health care service providers and with increasing challenges of securely managing electronic health records (EHR). In a Healthcare example, the systems and methods of the present invention help organizations accelerate adoption of clinical information systems by addressing one of the most significant problems within the largest industry in the U.S. with an innovative solution that allows this change to occur while protecting physician productivity; while driving costs from the system and while reducing days in Accounts Receivable by accelerating chart completion for billing.

Particular commercial applications include outpatient clinics (including specialists and multi-specialty groups), hospitals, and surgery centers for the automated, encrypted audio dictation and corresponding text-based documentation for improved speed, accuracy, and physician productivity, while also preserving complete data security and patient data privacy.

In the healthcare industry embodiment, the solution of the present invention interfaces with either schedules or census information to capture all relevant demographics and create client work lists. Doctors are still allowed to dictate relevant portions of the encounter (e.g. progress note, operative report, History & Physical, etc.) The dictation is automatically routed to a proprietary back-end system, where it is converted into a draft report through use of voice recognition technology, all while maintaining encryption of the audio data to ensure complete security of the patient-related information. At that point an editor reviews the information and finalizes the work product, i.e., the transcription text corresponding to the audio data. The finalized work product is automatically set to distribute to the healthcare organization through a document return rules engine. Finalized work can be returned as a single document (in any number of formats including but not limited to .doc, .rtf, .txt, etc), as an HL7 message set to interact with an organization's HL7 infrastructure, as segments of text which are automatically inserted into multiple points in an organization's database, or any combination(s) of the above.

Integration of data and the ability for disparate entities to share encrypted and private documentation with complete security is a critical element of any infrastructure, regardless of the industry application of the present invention. Beyond the medical and healthcare industry for dictation and transcription, the systems and methods of the present invention also have application in other areas where secure audio recording, saving, management, editing, reviewing, and transcribing, and combinations thereof, are used. Significantly, the spoken audio is automatically transformed on the mobile device to be encrypted, synced on back end, transcribed, saved, and returned to the dictator user for additional editing on the mobile device.

Law Enforcement Example

In a law enforcement application, a police officer called to a crime scene, where on the site location, the officer is the dictator user, who uses a mobile device for recording audio input, including interviews with multiple people, narratives and/or incident reports (e.g., by speaking into the device and describing the scene, witness names, description of the areas, anything that has to do with the incident, etc., what was said during an arrest, anything made as a statement by a witness, etc.). Upon recordation on the mobile device, the audio input (spoken report) is automatically immediately transformed or converted into encrypted audio data, and more preferably into segments of encrypted audio data, each segment having the exact same length or size, which is then available to be efficiently used on a mobile device for functions including to be saved, edited, managed, transferred, etc., as described herein in this specification.

Transcription of the encrypted audio data is also provided, either automatic transformation on the mobile device or server computer, or after transfer to the server computer a third party provides transcription into an incident report, which is a specific format of the encrypted audio data. Significantly, the spoken audio is automatically transformed on the mobile device to be encrypted, synced on back end, transcribed, saved, and returned to the dictator user, which in this case, is a police officer or detective or other law enforcement.

Legal Services Example

In another industry example, the legal profession uses dictation of attorney-client privileged and/or confidential information. An attorney is the dictator user who speaks into a microphone (built-in or external) on the mobile device to provide spoken audio inputs relating to a case; as with the other case study examples listed in the foregoing, upon recordation on the mobile device, the audio input (spoken report) is automatically immediately converted to encrypted audio data, which is available to be saved, edited, managed, transferred, etc. A legal transcribed case file is also provided, maintaining the encrypted audio data and/or the encrypted transcription corresponding thereto in a completely secure workflow.

For example, once again in the medical field, physicians (doctors, or dictator users) must do an operative report after performing surgery at a location. The present invention systems and methods and software are operable to finalize and route reports dictated at the hospital or surgery center facility to the doctor at his home clinic or another remote location for review and signature, all while retaining complete encryption of the dictation or recorded audio. All audio-related functions are operable inside the software application of the present invention, preferably from a mobile device, such as a tablet device, smartphone, mobile communication device, and the like, and more preferably, those mobile devices running Apple's proprietary iOS platform. or through a web portal.

The present invention provides for complete data security because the audio data and/or corresponding text data are encrypted at every stage of data management, from the time of initial recording, through managing, editing, saving, etc. In other words, dictator users can dictate discrete text segments while still having the speed and flexibility of mobility, i.e., using a mobile device for targeted, field-specific dictation of audio data into a templated interactive graphic user interface (GUI), wherein on a real-time basis of dictation, the audio data stream is transformed automatically by the system into encrypted chunks, modules, segments, or slices of recorded data.

Additionally, the software of the present invention includes an additional application that intercepts the audio stream during recording, sending the audio in an encrypted tunnel to a data center where the audio is immediately converted to text and returned to the application. The recognized text is then automatically inserted into an external application (e.g., in healthcare industry, the EHR) at the location where the cursor was currently sitting when the intercept application was started. This provides operability for electronic record-agnostic integration, i.e., embedding the proprietary software, methods, and systems of the present invention with any electronic records provider without significant development programming required for the integration, for example being offered on a tablet computer such as the Apple iPad mobile device. The systems and methods of the present invention further provide for mobile applications utilizing Apple iPhone operating system, namely iOS, in the preferred embodiments. It may be possible for alternative versions to be operable on other systems, such as Google Android, Microsoft, and RIM Blackberry operating systems.

The present invention provides a documentation solution to any audio-based dictation environment, through an automated, secure information workflow using encrypted data "chunks", or modules, segments, and/or slices, which are predetermined identical lengths of recorded encrypted data. This audio input originates from a suitable mobile device, including but not limited to devices such as the commercially available products from Apple, namely commercial products including mobile phones, smartphones, personal mobile devices, tablet computers, respectively known under trademarks such as iPhone, iPod Touch, and/or iPad.

Significantly, according to the present invention, every audio recording immediately becomes encrypted audio data upon storing on the device. As illustrated in the schematic and flow diagram of FIG. 2, a multiplicity of Apple mobile devices are illustrated in communication with a mobile web service, and then a mobile audio server, to an audio delivery location. Alternatively, a computer or PC direction connects via network to an audio delivery location. Each of the devices or computers in communication with the rules engine runs applications of the software of the present invention to manage the encrypted audio data on any of the multiplicity of mobile devices and/or PC. These applications allow a dictator user to select a job to be dictated from a job list that is generated by data based upon an automated remote interface with a server computer and/or database having an electronic data management system. For example, scheduling data is related to a dictation job list through a crosswalk table, referenced herein as a rules engine. In the crosswalk table, the number and types of jobs generated for each dictator user is configured based on each combination of location, dictator, interviewee(s), type, reason for recording, code(s), and combinations thereof. This advantageously provides greater flexibility to customize jobs by user preference.

Figure 6:
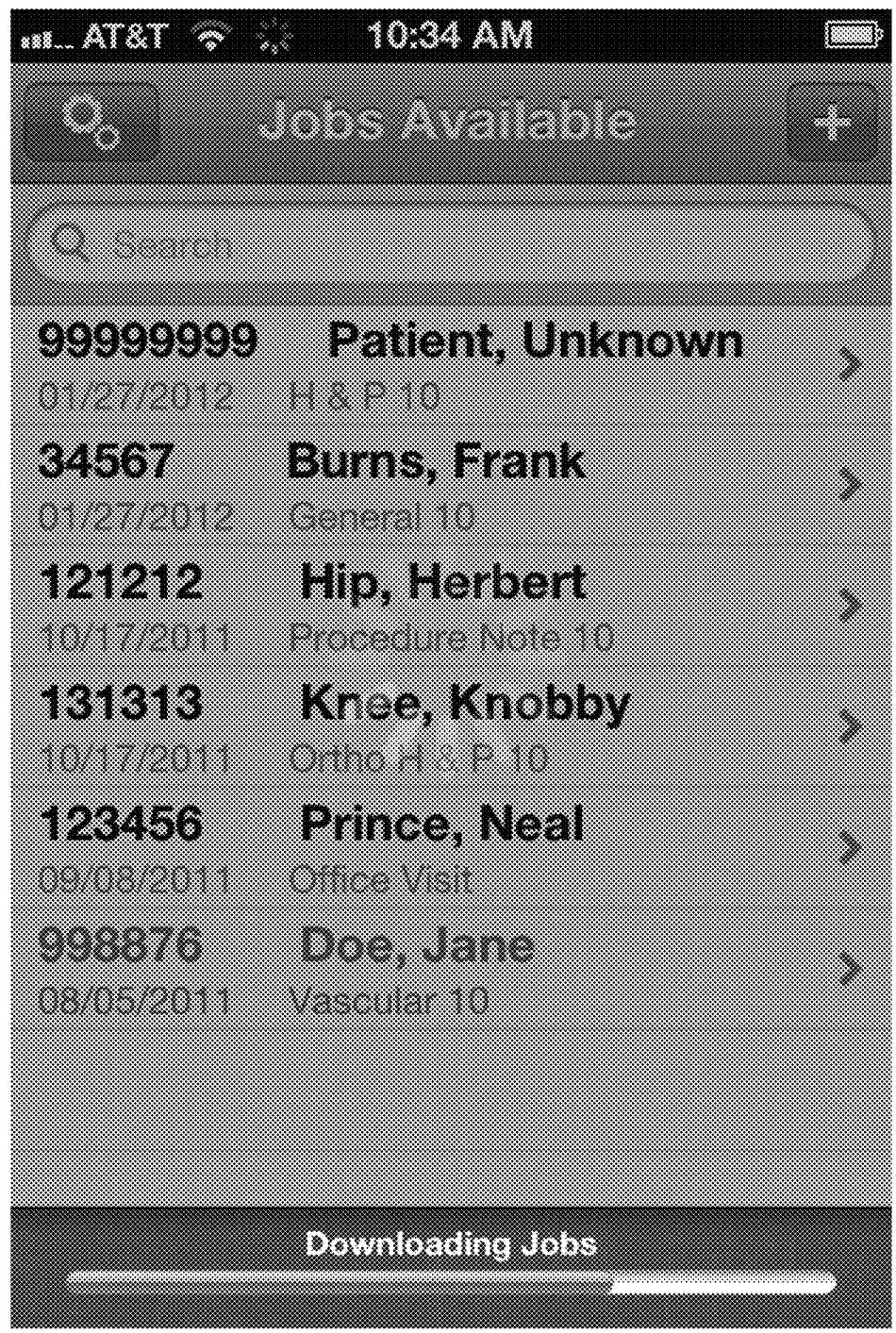
FIG. 6 shows a screen shot of another interactive GUI on a mobile device according to one embodiment of the present invention.

In one embodiment of the present invention, a dictator user either begins recording or selects from a listing of jobs to be dictated in an interactive graphic user interface (GUI) on a display. A GUI illustrating "jobs available" is shown in FIG. 6, including a search function and a status bar indicating jobs downloading completed and remaining on a continuous line bar (at bottom). The mobile device receives a voice audio file that is captured through a speech microphone either built-in and/or peripheral device on the dictator's mobile device, smartphone, etc. and records the audio. The user has the ability to rewind and edit their dictation at any point in the encrypted audio data, without having to edit the entire data file by simply selecting the point at which the editing is to occur.

These systems and methods allow for rapidly managing or editing encrypted audio data without on disk files having to be manually moved or divided into pieces; this is a significant advantage of the encryption of audio data into segments having equal length, which is nowhere taught or described in prior art audio recordation, management, encryption, and/or editing. For example, on a less sophisticated system, the prior art type systems and methods may manually split the original audio file into two files, insert the additional audio at the end of the first file and then append the final five seconds of audio, making one continuous file. The limited resources on mobile devices make operations like this very slow with encrypted data.

The rules engine resides within the client's information systems environment. After a job has been selected from the work list, dictated, and released by the user, the rules engine automatically creates a secure connection with a remote datacenter, where the encrypted job is automatically routed through a third party voice recognition engine and converted from a voice file into text, and transformed to an encrypted audio data file in real time, i.e., without noticeable delay from the point of creation and/or file save or transfer. The encrypted job is then available to a medical editor for completion edits. Once the job has cleared editing, while retaining encrypted format for the overall job (all chunks in series), except for any "chunk", segment, or audio data module undergoing editing at any given moment, it is automatically routed back to the client's environment to the rules engine software where it is automatically routed to the appropriate return location for the client, all while the data is completely encrypted. The encrypted audio data is then automatically provided securely for approval. Competed jobs are returned in multiple file formats depending upon client preferences and/or selected formats.

The system automatically provides for the data-secure functions of editing, including review, rewind, insert, delete, and overwrite of any dictation or audio inputs after it has been automatically transformed into encrypted audio data prior to being submitted into the workflow. Once submitted the system automatically provides for the removal of the dictated jobs from the dictator's work list. Dictators have the ability to add jobs not listed, delete existing jobs, change dictate job types, and combinations of these functions.

Systems and methods according to the present invention have applications for providing innovative documentation solutions that simplify the process of adopting and using a mobile-based audio input capture, automated immediate conversion to encrypted audio data, and editing of the encrypted audio data on the mobile device on which the audio inputs were initially created, and/or on any other mobile device, provided an authorized user/dictator is accessing the encrypted data. A secure login/password or other user security may be provided on the mobile device. For example with a specific dictator's username and password, or other client-specific code, being entered and saved into the device's configuration settings, the dictation user authenticates by using a client-specific code (unique client identifier, e.g., a single personal identification number (PIN)). Once logged in, dictation users view a listing of jobs to be dictated that are specific to their unique client identifier. Jobs are selected for dictation, and a voice audio file is captured through a microphone in the mobile device, and encrypted in real time to ensure complete data security, even when editing. At the time of recording of the audio inputs by the mobile device, the system automatically converts or transforms the audio inputs into encrypted audio data.

Additionally, the present invention provides for a secure, mobile-device-based application used to capture dictations that are automatically transformed to an encrypted audio data format upon recordation on the mobile device. In addition to the functions set forth in the foregoing, the encrypted audio data may be processed for automatic conversion from audio to digital text, while maintaining complete encryption of the data.

Certain modifications and improvements will occur to those skilled in the art upon a reading of the foregoing description. While the preferred embodiments of the present invention are directed to applications on mobile devices running iOS platform specifically, application for the functionality described in the foregoing on any mobile devices using other operating systems, such as Google Android, Microsoft, and RIM Blackberry mobile applications, are contemplated.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for secure audio data management and editing comprising the steps of:
   providing a base system including a remote server computer having a memory, a processor, and power supply connected thereto, in communication via a network with at least one mobile device constructed and configured for receiving an audio input;
   a user selecting through the at least one mobile device a job from a job list;
   the system receiving or recording the audio input by the at least one mobile device and automatically transforming the audio input into encrypted audio data at the time the audio input is being recorded on the at least one mobile device;
   the system automatically transforming the encrypted audio data into a series of encrypted audio data segments, each of the segments having an order and a content, respectively, wherein each of the encrypted audio data segments is editable in its encrypted form;
   storing each of the encrypted audio data segments on the mobile device;
   transforming each of the encrypted audio data segments into encrypted text segments that correspond to the audio input; and
   the user providing a selection input via a graphic user interface of the mobile device, wherein the selection includes an editing function to be performed to one of the encrypted audio data segments or more of the encrypted text segments.

2. The method of claim 1, further including the step of the at least one mobile device communicating with the remote server computer via wireless communication over the network for transmitting the encrypted audio data.

3. The method of claim 1, wherein the method provides the audio data and/or its transcribed equivalent are completely encrypted from the time of generation and capture as the audio input by the at least one mobile device.

4. The method of claim 1, wherein the method provides for the audio data to be encrypted at all times, including and not limited to transfer to a remote data server (database), editing remotely from the dictation generation and/or on a mobile device by the dictation user/generator, saving, and combinations thereof.

5. The method of claim 1, wherein the step of automatically transforming the audio inputs into encrypted audio data occurs simultaneously with audio inputs recording by the at least one mobile device.

6. The method of claim 5, wherein the audio inputs are automatically encrypted in a series of data modules or segments.

7. The method of claim 5, wherein the audio inputs are automatically encrypted in a series of data modules or segments including exactly the same amount of data.

8. The method of claim 7, wherein the encrypted audio data segment size is equivalent to about 128 bytes.

9. The method of claim 8, further including the step of the system providing further transformation of the encrypted audio data, including editing via the at least one mobile device.

10. The method of claim 8, wherein the at least one mobile device operable on a proprietary operating system, namely iOS.

11. A method for secure audio data management comprising the steps of:
   providing a mobile device constructed and configured for receiving an audio input;
   receiving the audio input by the mobile device and automatically transforming the audio input into encrypted audio data at the time the audio input is being recorded on the mobile device;
   an application intercepting the audio input at the time the audio input is being recorded on the mobile device, the application then sending the audio input in an encrypted tunnel to a data center;
   the data center immediately converting the audio input to text and returning the text to the application;
   inserting the text into an external application at a location where a cursor was positioned when the application began intercepting the audio input;
   automatically transforming the encrypted audio data into a series of encrypted audio data segments, each of the segments having an order and a content, respectively;

responsively managing, seeking, and streaming the encrypted audio data on the mobile device using the stored encrypted audio data segments;

automatically combining those edited segments during playback/streaming; and wherein each of the encrypted audio data segments is editable in its encrypted form, without affecting the order or content of the non-edited segments.

12. The method of claim 11, wherein the predetermined amount of data is equivalent to about 128 bytes.

13. The method of claim 11, further including the step of the system providing further transformation of the encrypted audio data, including editing via the at least one mobile device.

* * * * *